(12) United States Patent
Borsarelli et al.

(10) Patent No.: US 8,650,909 B2
(45) Date of Patent: Feb. 18, 2014

(54) MULTIFUNCTIONAL GROUP FOR A GLASS ITEMS FORMING MACHINE

(71) Applicant: Bottero S.p.A., Cuneo (IT)

(72) Inventors: Gianclaudio Borsarelli, Cuneo (IT); Mario Balbi, Cuneo (IT); Maurizio Barolo, Fossano (IT)

(73) Assignee: Bottero S.p.A., Cuneo (IT)

( * ) Notice: Subject to any disclaimer, the term of this patent is extended or adjusted under 35 U.S.C. 154(b) by 0 days.

(21) Appl. No.: 13/693,587

(22) Filed: Dec. 4, 2012

(65) Prior Publication Data

US 2013/0160494 A1  Jun. 27, 2013

Related U.S. Application Data

(62) Division of application No. 12/460,363, filed on Jul. 17, 2009, now Pat. No. 8,341,977.

(30) Foreign Application Priority Data

Jul. 17, 2008 (IT) .............................. TO2008A0550

(51) Int. Cl.
*C03B 9/14* (2006.01)
*C03B 9/36* (2006.01)

(52) U.S. Cl.
USPC ................... 65/261; 65/169; 65/207; 65/225; 65/300; 65/72; 65/82; 65/122

(58) Field of Classification Search
USPC ......... 65/76, 68, 122, 81, 169, 207, 225, 233, 65/234, 261, 264, 300, 243, 227
See application file for complete search history.

(56) References Cited

U.S. PATENT DOCUMENTS

| | | | | |
|---|---|---|---|---|
| 1,911,119 A | * | 5/1933 | Ingle | 65/219 |
| 3,125,429 A | | 3/1964 | Lauck et al. | |
| 3,536,468 A | * | 10/1970 | Colchagoff | 65/208 |
| 4,004,905 A | * | 1/1977 | Mumford | 65/159 |
| 4,013,437 A | * | 3/1977 | Northup | 65/76 |
| 4,120,683 A | | 10/1978 | Irwin | |
| 4,191,548 A | * | 3/1980 | Fortner et al. | 65/79 |

(Continued)

FOREIGN PATENT DOCUMENTS

WO  WO 2008/045209 A1  4/2008

OTHER PUBLICATIONS

Italian Search Report issued Jun. 15, 2009 for corresponding Italian Patent Application No. TO2008A 000550.

(Continued)

*Primary Examiner* — Jason L. Lazorcik
(74) *Attorney, Agent, or Firm* — Ohlandt Greeley Ruggiero & Perle L.L.P.

(57) ABSTRACT

A rough mold of a machine for forming glass items is provided with a multifunctional group, which has a common support head; a handling device for moving the common head along a first handling axis; and a further handling device for rotating the common head about a second handling axis; the common head being fitted with a mold closing member for sealing the top opening of the rough mold, and at least one further operating member selectable from a funnel-shaped member for guiding at least one glass gob into the rough mold, a blowing member for blowing pressurized air into the rough mold, and one or more members for treating the inner surface of the rough mold.

5 Claims, 4 Drawing Sheets

(56) References Cited

U.S. PATENT DOCUMENTS

| | | | | |
|---|---|---|---|---|
| 4,362,544 A | * | 12/1982 | Mallory | 65/163 |
| 4,444,578 A | * | 4/1984 | Marroquin | 65/209 |
| 4,610,713 A | * | 9/1986 | Clegg | 65/300 |
| 4,695,307 A | * | 9/1987 | Nebelung | 65/242 |
| 4,756,736 A | * | 7/1988 | Fenton | 65/225 |
| 4,765,821 A | * | 8/1988 | Doud | 65/169 |
| 4,990,171 A | * | 2/1991 | Kojima et al. | 65/169 |
| 5,597,396 A | * | 1/1997 | Tohjo | 65/169 |
| 5,685,888 A | * | 11/1997 | Tijerina-Ramos | 65/68 |
| 5,769,920 A | * | 6/1998 | Sweetland et al. | 65/374.15 |
| 5,858,050 A | * | 1/1999 | Slocum et al. | 65/225 |
| 5,958,099 A | * | 9/1999 | Morettin | 65/26 |
| 5,958,101 A | * | 9/1999 | Pinkerton et al. | 65/240 |
| 6,240,747 B1 | * | 6/2001 | Fenton et al. | 65/208 |
| 6,902,708 B1 | * | 6/2005 | Nutz et al. | 422/150 |
| 2010/0018254 A1 | * | 1/2010 | Borsarelli et al. | 65/68 |

OTHER PUBLICATIONS

European Search Report dated Oct. 21, 2009 for corresponding European Patent Application No. 09165845.0.

* cited by examiner

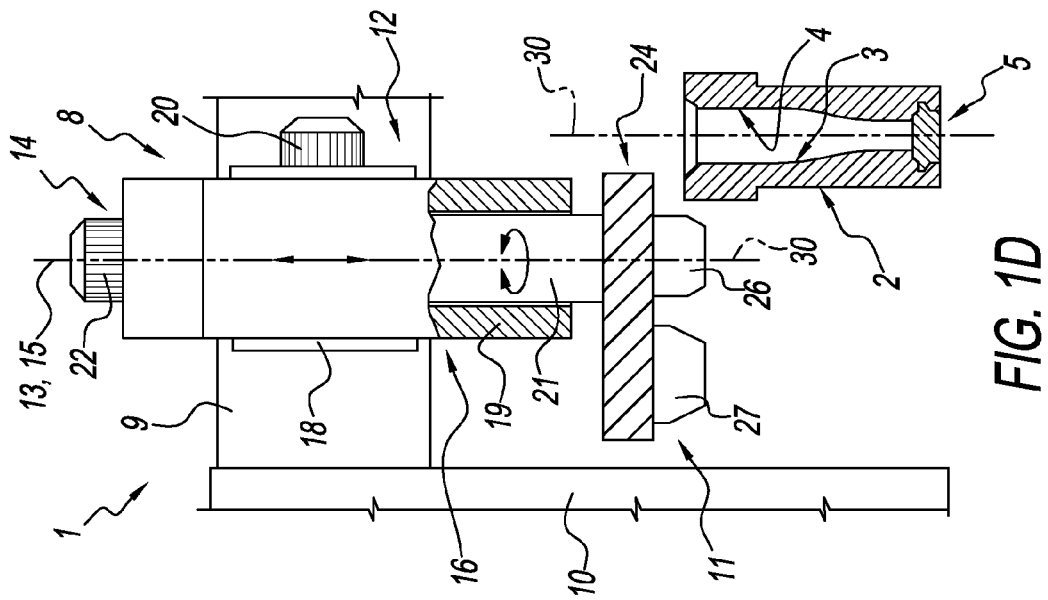
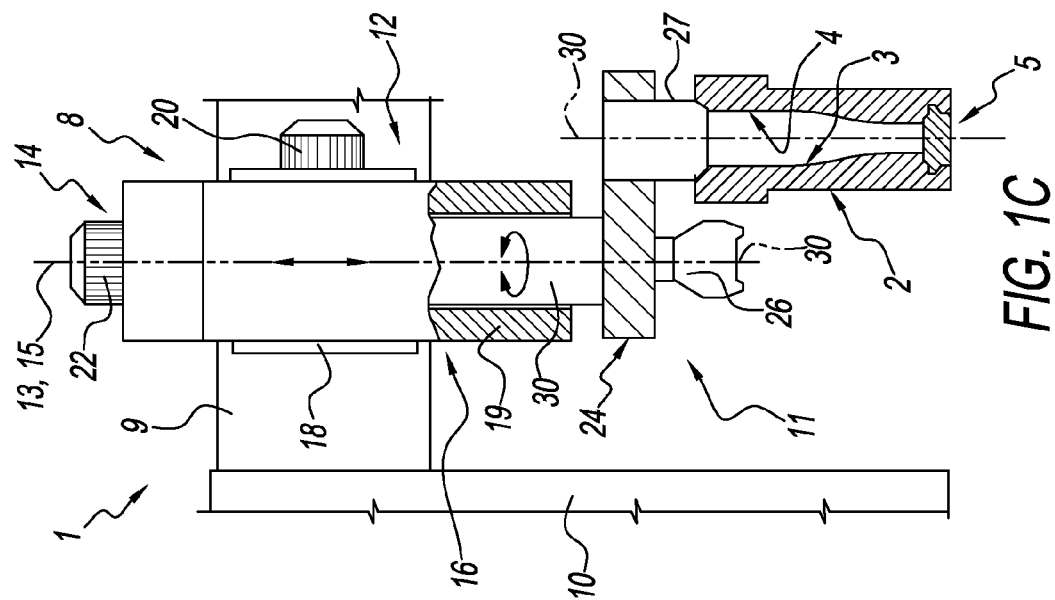

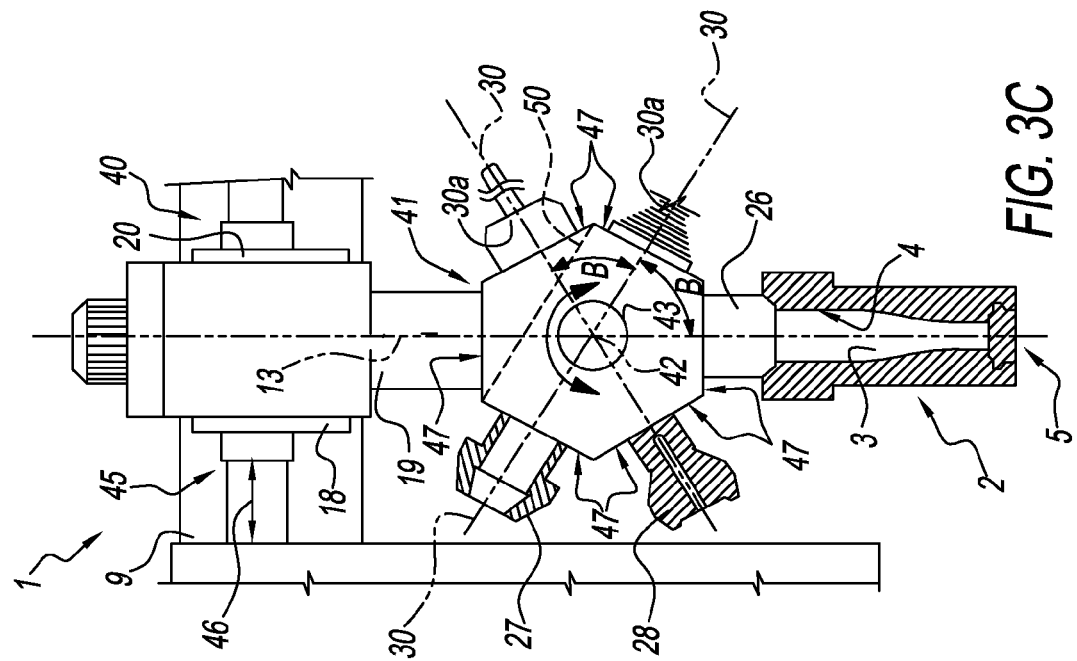
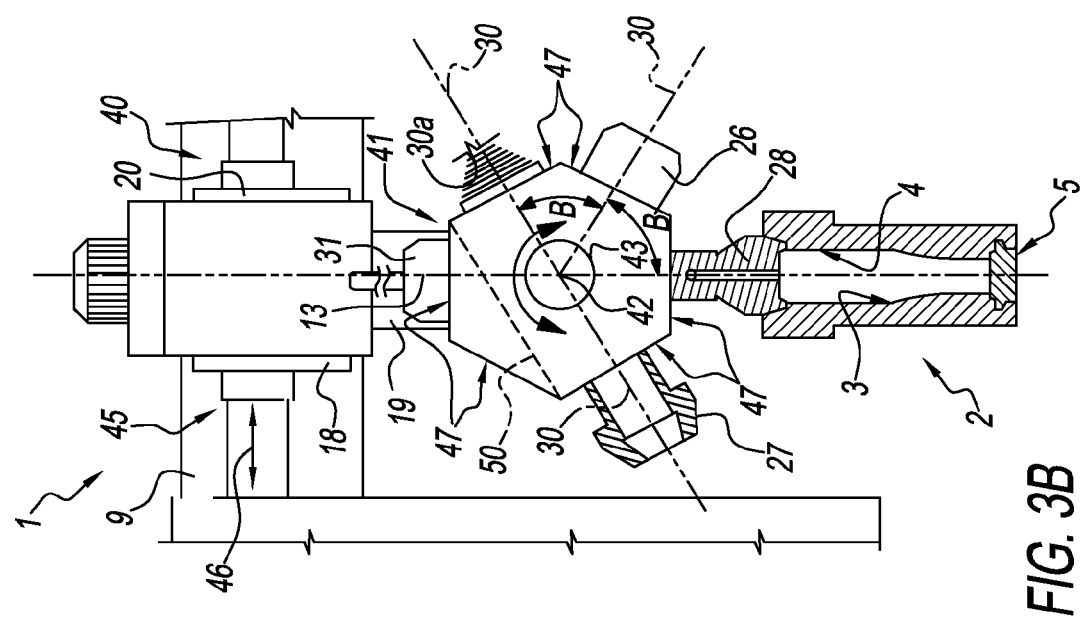
FIG. 3C
FIG. 3B

MULTIFUNCTIONAL GROUP FOR A GLASS ITEMS FORMING MACHINE

CROSS REFERENCE TO RELATED APPLICATIONS

THIS application is a divisional of prior application Ser. No. 12/460,363, filed Jul. 17, 2009, now pending, that claims benefit under 35 U.S.C. §119(a) of Italian Patent Application No. TO2008A 000550 filed Jul. 17, 2008. The contents of application Ser. No. 12/460,363, filed Jul. 17, 2009 and Italian Patent Application No. TO2008A 000550 filed Jul. 17, 2008 are hereby incorporated herein by reference in their entirety.

The present invention relates to a multifunctional group for a glass item forming machine.

More specifically, the present invention relates to a multifunctional group for what is commonly known as an I.S. glass item forming machine.

BACKGROUND OF THE INVENTION

In the manufacture of hollow glass items, a forming machine is known comprising a rough mold for receiving one or more molten-glass gobs; and a finish mold for completing the semifinished item/s formed in the rough mold. The rough mold is flanked by various independent operating units, each for performing a given function, and in particular: a funnel function to guide the glass gobs from a dispenser into the rough mold; a closing function to close the top opening of the rough mold; and a blowing function to exert thrust on the glass gob fed into the rough mold, to settle the glass gob on the bottom of the rough mold. In addition to the above functions, the machine is fitted with auxiliary mold treating units, e.g. for removing deposits from, and lubricating, the inner surface of the rough mold.

In known machines, each of the above units has its own dedicated supporting structure connected to a common fixed supporting frame, close to the rough mold, and is operated by a respective dedicated actuator independent of the other actuators and, in most cases, at least partly housed inside the relative supporting structure. Most of the actuators comprise at least one pneumatic or hydraulic component, while others comprise mechanical actuating cams.

Though widely used, known forming machines find it increasingly difficult to meet current market demand in terms of increasingly fast output rates, fast machine assembly and reconfiguration for production and/or mold changes, easy control and performance of the various functions, and weight and size reduction.

SUMMARY OF THE INVENTION

It is an object of the present invention to provide a multifunctional group designed to meet the above requirements in a straightforward, low-cost manner.

According to the present invention, there is provided a multifunctional group adapted to be associated with a rough mold of a glass items forming machine, the group being characterized by comprising a common support head, first handling means adapted to move said common head along a first handling axis, and second handling means adapted to rotate said common head around a second handling axis; a closing member carried by said common head adapted to close the top opening of said rough mold, and at least a further operative member also carried by said common head and selectable among a funnel-shaped guiding member, for guiding at least one glass drop into said rough mold, a blowing member for blowing a pressurised airflow into said rough mold and surface treatment members for treating the internal surface of the rough mold.

BRIEF DESCRIPTION OF THE DRAWINGS

A non-limiting embodiment of the invention will now be described by way of example with reference to the accompanying drawings, in which:

FIG. 1C shows a schematic side view, substantially in blocks and with parts removed for clarity, of the multifunctional group of FIG. 1A in a third operating position;

FIG. 1D shows a schematic side view, substantially in blocks and with parts removed for clarity, of the multifunctional group of FIG. 1A in a fourth operating position;

FIG. 3B shows a schematic side view, substantially in blocks, of the multifunctional group of FIG. 3A in a second operating position over a mold; and FIG. 3C shows a schematic side view, substantially in blocks, of the multifunctional group of FIG. 3A in a third operating position over a mold.

DETAILED DESCRIPTION OF THE INVENTION

Figure 1A:
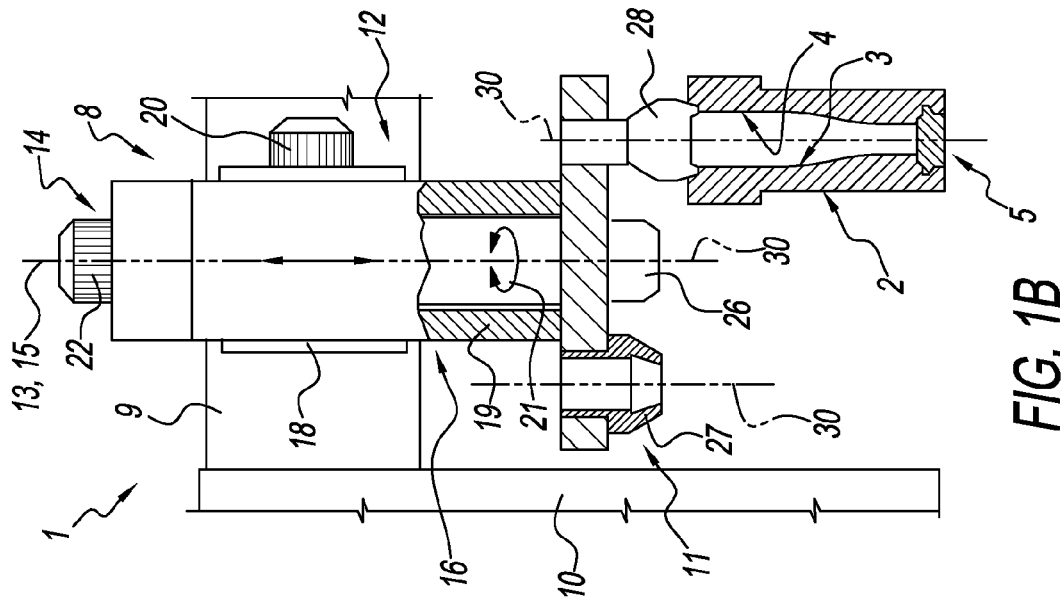
FIG. 1A shows a schematic side view, substantially in blocks and with parts removed for clarity, of a first preferred embodiment of the multifunctional group in accordance with the teachings of the present invention and in a first operating position.

Number 1 in FIGS. 1A-1D indicates as a whole a forming section (shown partly) of a machine for producing hollow glass items. Forming section 1 comprises a rough mold 2 having one or more mold cavities 3 bounded by respective inner surfaces 4; a known finish mold (not shown); and a take-out and transfer device 5, commonly known as an "invert" and only shown partly in the drawings, for removing one or more semifinished items from rough mold 2 and transferring them to the finish mold by rotating them about a fixed transverse hinge axis.

As shown in FIGS. 1A-1D, rough mold 2 is flanked by a multifunctional group 8 comprising a fixed mounting cross member 9 connected firmly to uprights 10 of section 1, in a raised position with respect to rough mold 2; and a multifunctional head 11. Multifunctional group 8 also comprises a handling device 12 for moving multifunctional head 11, to and from cross member 9 and rough mold 2, along a fixed vertical handling axis 13 perpendicular to cross member 9; and a handling device 14 for rotating multifunctional head 11, with respect to cross member 9 and rough mold 2, about a fixed vertical handling axis 15 coincident, in the example shown, with axis 13. Alternatively, in a variation not shown, axes 13 and 15 are parallel and spaced transversely part.

In the example described, device 12 comprises a guide-and-slide assembly 16, in turn comprising a vertical guide 18 connected firmly to the cross member, and a hollow slide 19 fitted to guide 18 to run along axis 13 and operated by an electric motor reducer 20. A vertical torsion shaft 21 extends through slide 19, is connected to slide 19 in rotary and axially sliding manner, extends coaxially with axis 15, and is rotated in opposite directions about axis 15 and with respect to guide 18 by a known electric rotary actuator 22 not described in detail and forming part of device 14.

Shaft 21 has an end portion which projects axially from guide 18 towards rough mold 2, and is fitted integrally with multifunctional head 11. As shown in FIGS. 1A-1D and particularly in FIG. 2, multifunctional head 11, which is conveniently disk-shaped, extends perpendicularly to axis 15, and comprises a circular plate-like body 23 coaxial with axis 15 and bounded by a flat radial facet 24 adjacent to the outer surface of guide 18.

Figure 2:
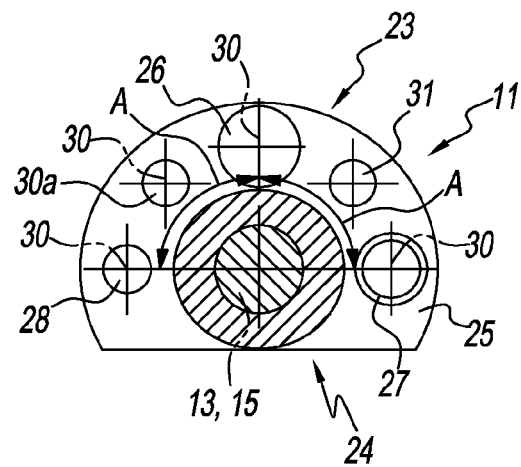
FIG. 2 shows a section along line II-II in FIG. 1A.

An outer peripheral portion 25 of the circular body is fitted integrally with a closing member 26 for closing the top opening of rough mold 2; a funnel-shaped guiding member 27 for guiding at least one glass gob into rough mold 2; and a blowing member 28 for blowing pressurized air into rough mold 2. Members 26, 27, 28 extend along respective axes 30 parallel to axes 13 and 15 and arranged angularly along portion 25. In the example described, axes 30 are spaced angularly apart by an angle A of substantially 90°, as shown in FIG. 2. Alternatively, in different embodiments not shown, axes 30 are spaced angularly apart by angles A ranging between 40° and 90°.

As shown in FIG. 2, the head comprises two members for treating the inner surface 4 of the mold and, in particular, a powered mechanical cleaning member 30a for removing scale from surface 4 of rough mold 2 and conveniently interposed between members 26 and 28; and a known spraying member 31, shown schematically, for spraying lubricant onto surface 4 and located between members 26 and 27.

In actual use, before a molten-glass gob is fed to rough mold 2, multifunctional head 11, set to the raised position, is rotated about axis 15 to position facet 24 or funnel-shaped member 27 at the inlet of rough mold 2, depending on whether or not the production technology and/or the shape of cavity 3 of rough mold 2 require the use of funnel-shaped member 27 (FIGS. 1A and 1D). If funnel-shaped member 27 is used, head 11 is then moved along axis 13 towards rough mold 2, and funnel-shaped member 27 is connected to rough mold 2, as shown in FIG. 1A.

Figure 1B:
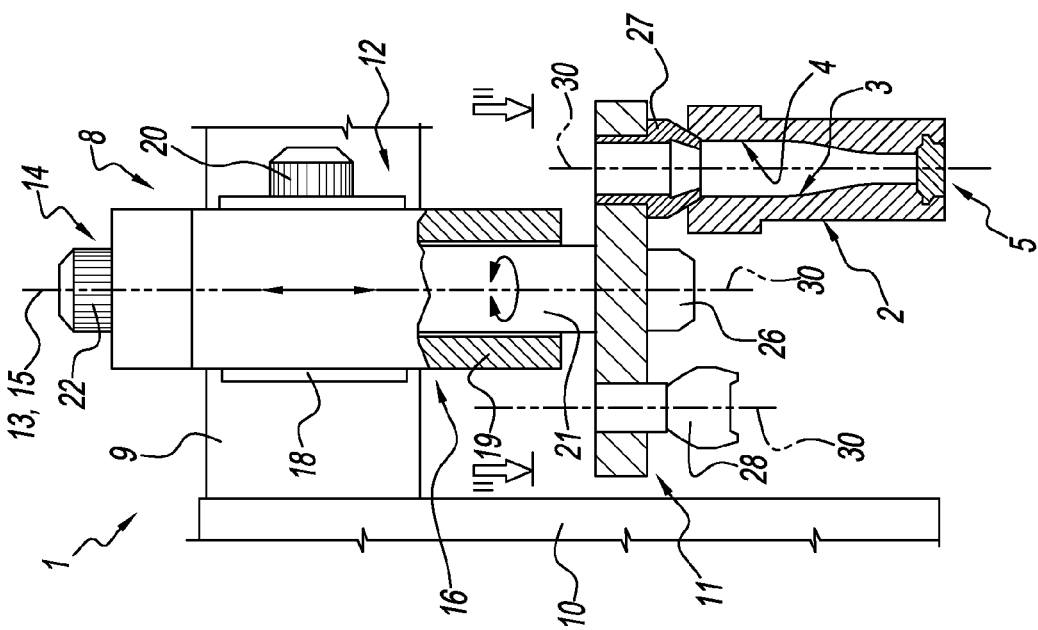
FIG. 1B shows a schematic side view, substantially in blocks and with parts removed for clarity, of the multifunctional group of FIG. 1A in a second operating position.

Once the gob is inside rough mold 2, head 11, if in the lowered position, is raised, is rotated about axis 15 to position axis 30 of blowing member 28 coaxial with the axis of rough mold 2, and is then lowered again so that blowing member 28 closes rough mold 2, as shown in FIG. 1B. In this position, blowing member 28 blows an air jet into rough mold 2 to settle the gob on the bottom of rough mold 2. Once the blowing stage is completed, head 11 is raised and rotated about axis 15 to position axis 30 of closing member 26 coaxial with the axis of mold 2, and is then lowered so that closing member 26 closes mold 2, as shown in FIG. 1C. After which, the gob inside rough mold 2 is deformed in known manner to obtain a corresponding semifinished item. Once the forming stage is completed, head 11 is raised and rotated about axis 15 to position facet 24 at mold 2 (FIG. 1D), after which, mold 2 is opened and the semifinished item/s extracted by take-out device 5, which rotates to transfer at least the semifinished items facing facet 24 to the finish mold.

If necessary, before or after being closed, the inner surface of the rough mold is treated by rotating and lowering head 11 to insert member 30a and/or member 31 at least partly inside rough mold 2.

Figure 3A:
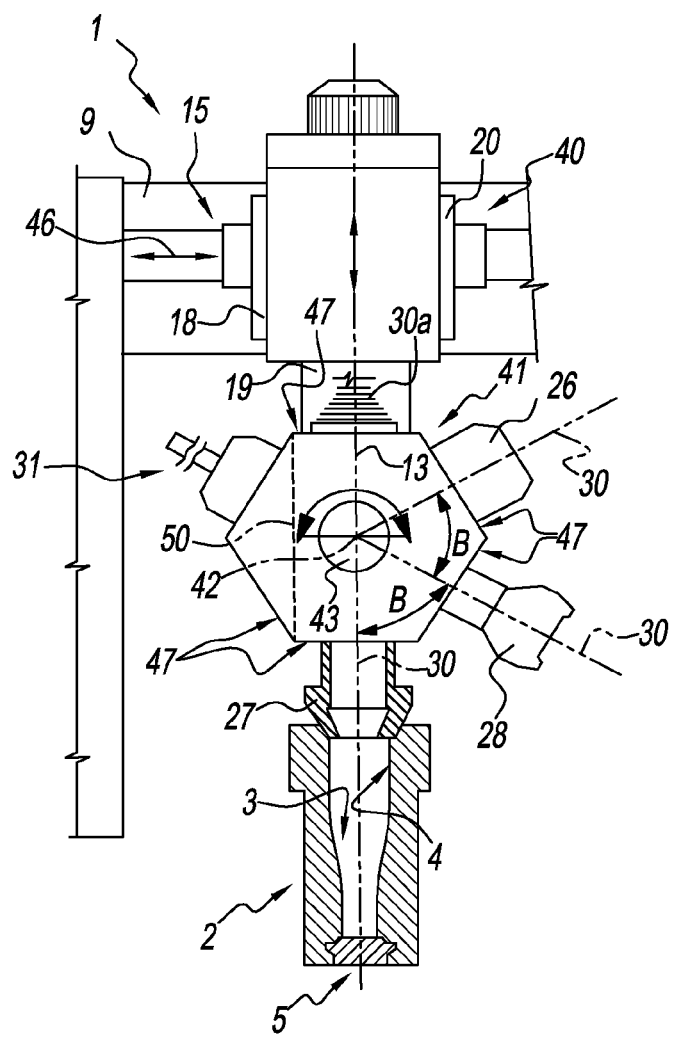
FIG. 3A shows a schematic side view, substantially in blocks, of a second preferred embodiment of the multifunctional group in accordance with the teachings of the present invention and in a first operating position over a mold.

The embodiment shown in FIGS. 3A-3C relates to a multifunction group 40, which differs in some respects from multifunctional group 8, and the component parts of which are indicated, where possible, using the same reference numbers as for the corresponding parts of group 8.

Group 40 comprises a drum-shaped multifunctional head 41 connected to the bottom end of slide 19 and rotated in opposite directions about an axis of rotation 42, perpendicular to axis 13, by an electric motor reducer device 43 shown schematically. Slide 19 is again connected to guide 18, which, in group 40, is connected to cross member 9 with the interposition of a further guide-and-slide device 45 for moving guide 18, and therefore slide 19 and head 41, in a direction 46 parallel to cross member 9 and perpendicular to axes 13 and 42.

In the example described, head 41 is hexagonal and bounded laterally by a number of faces 47, from some of which funnel-shaped member 27, blowing member 28, closing member 26, mechanical cleaning member 30a and lubricant spraying member 31 project radially, so that axes 30 of the various members extend perpendicular to axis 42 and form angles B of substantially 45° with one another.

In actual use, head 41 is raised to prevent members 26-28 from contacting mold 2, is then rotated in steps about axis 42 to successively position members 26-28, each with its axis 30 coincident with the axis of rough mold 2, and is then lowered to connect the various members to rough mold 2 in the sequence described for multifunctional head 11.

If the gob is fed into rough mold 2 without the aid of funnel-shaped member 27, head 41, together with slide 19, is moved by device 45 in direction 46 to obtain free access to the inlet of rough mold 2. For this purpose, to minimize the movement of head 41 in direction 46, head 41 is relieved of one of the members—in this case, member 31—and is milled to form a cut-away face 50 of the type, for example, shown by the dash line in FIGS. 3A-3C. Likewise, head 41 and slide 19 are withdrawn in direction 46 from the inlet of mold 2 before extracting and transferring the semifinished item to the finish mold. For some types of rough molds, head 41 is withdrawn from the inlet of rough mold 2 by simply moving head 41 along axis 13 towards cross member 9.

The particular design characteristics of multifunctional groups 8 and 40 described therefore provide, above all, for reducing the on-board bulk of the machine, thus greatly simplifying control of members 26, 27, 28, 30a and 31. In the solutions described, in fact, members 26, 27, 28, 30a, 31 are all controlled by electric motors, with no dedicated pneumatic and/or cam mechanisms for each member as in known solutions.

Using multifunctional groups 8, 40, as opposed to independent single mechanisms, as in known solutions, also provides for fast function changeover and, therefore, faster output of section 1 and the machine as a whole.

Combining the various members of the rough mold into one group also provides, as compared with known solutions with separate, independent members, not only for much faster machine assembly but also, and above all, for faster reconfiguration when making production and/or mold changes.

Lastly, fitting members 26, 27, 28, 30a, 31 to one supporting head and connecting the head to one cross member greatly reduces overall weight, while at the same time achieving a group that is simple in design and cheap to produce, and also increasing the space available to the mechanisms arranged about the multifunctional head.

Clearly, changes may be made to groups 8 and 40 as described herein without, however, departing from the protective scope as defined in the independent Claims.

In particular, supporting heads 11 and 41 may differ in shape and geometry from those indicated by way of example, the various members may be arranged differently on the head, and the number and type of members fitted to heads 11 and 41 may differ. More specifically, heads 11 and 41 may support one or more multifunctional members, i.e. each for performing two different functions, such as the closing function of closing member 26, and the blowing function of blowing member 28.

Devices 12, 14, 43, 45 for moving heads 11 and 41 may also differ from those described by way of example, and may comprise relative-motion assemblies other than but technically equivalent to those described, e.g. an articulated arm fitted, or not, to slide devices.

The invention claimed is:

1. A multifunctional group adapted to be associated with a rough mold of a glass items forming machine, the group comprising:
    a common support head;
    first handling means adapted to move said common support head along a first handling axis;
    second handling means adapted to rotate said common support head about a second handling axis that is perpendicular to the first handling axis;
    a closing member carried by said common support head adapted to close a top opening of said rough mold; and
    at least a further operative member also carried by said common support head including a funnel-shaped guiding member, for guiding at least one glass drop into said rough mold; a blowing member for blowing a pressurised airflow into said rough mold and surface treatment members for treating an internal surface of the rough mold,
    wherein the common support head is bounded laterally by a plurality of faces, and wherein the closing member, the funnel-shaped guiding member, the blowing member, and surface treatment members each project radially from one of the plurality of faces of the common support head so that each of the closing member, the funnel-shaped guiding member, the blowing member, and the surface treatment members extend perpendicular to the second handling axis from the common support head.

2. The group according to claim 1, wherein said second handling axis is an horizontal axis.

3. The group according to claim 1, wherein the closing member, the funnel-shaped guiding member, the blowing member, and the surface treatment members are carried by said common support head extend in a cantilevered fashion from said common support head along respective radial axes normal to said second handling axis.

4. The group according to claim 1, wherein said closing member, the funnel-shaped guiding member, the blowing member, and the surface treatment members are carried by the said common support head are substantially arranged along half a peripheral external portion of said support head.

5. The group according to claim 1, wherein said common support head has different peripheral external facetings and in that from at least part of said facetings extends one of said closing member, the funnel-shaped guiding member, the blowing member, and the surface treatment members.

* * * * *